Patented Nov. 7, 1939

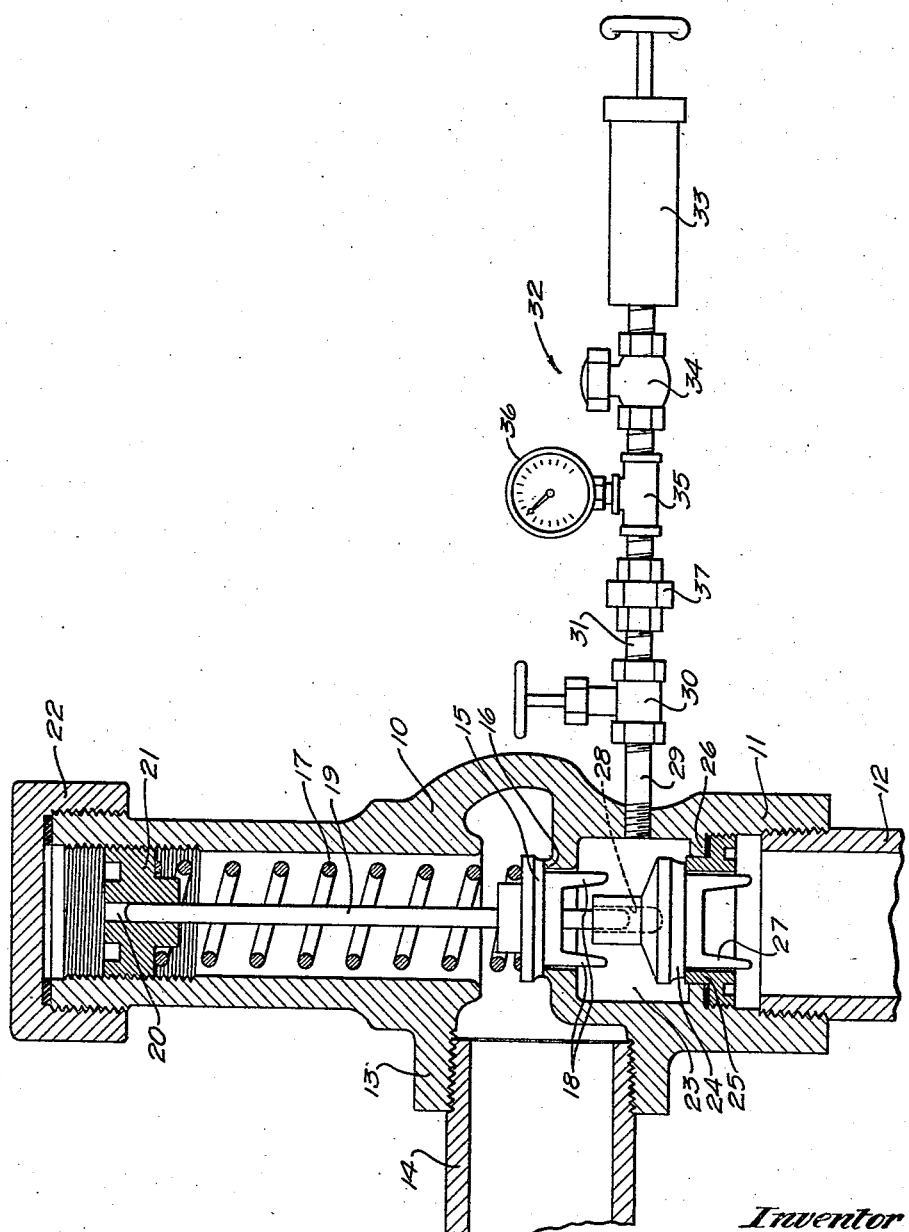

2,178,901

UNITED STATES PATENT OFFICE 2,178,901

COMBINATION RELIEF VALVE AND TESTER

John F. Webster, Costa Mesa, Calif.

Application March 2, 1938, Serial No. 193,491

6 Claims. (Cl. 73—51)

This invention relates generally to pressure responsive relief valve devices in which the relief valve proper is set to maintain a predetermined back pressure that usually is variable by adjustment of the valve. The principal object of the invention is to provide means for determining accurately the pressure at which the valve, at any particular adjustment, will open.

The ordinary relief valve is adapted to open at predetermined pressure, but various conditions may prevent the valve from opening at just the pressure at which it is set to maintain. Heretofore, there has been no way of ascertaining, other than by whatever indication the measurement of the pressure at the high pressure side of the valve may give the pressure at which the valve will open. In most situations, determination of the pressure at the high pressure side of the valve will not necessarily show the valve opening pressure, for the reason that the valve may or may not open at that pressure, and also because ordinarily that pressure is not conveniently variable to test the valve.

In accordance with the invention, I test the valve opening pressure by providing a second valve, preferably a self closing check valve, at the fluid inlet side of the relief valve, i. e. between the relief valve and the supply line, and introducing fluid under pressure to a chamber between the valves. The chamber fluid pressure acts to close the check valve and to isolate the chamber from the supply line, thus rendering the relief valve responsive to the chamber pressure alone, independently of the supply line pressure. The actual relief valve opening pressure is determined by indicating the fluid pressure in the chamber required to unseat the valve. Preferably, such fluid is introduced to the chamber by a normally disconnected testing apparatus comprising a portable pump and a pressure gage combination that may be used as a testing unit for any number of relief valve assemblies of the present type.

The above mentioned and various additional features of the invention will be more fully understood and explained to better advantage in the following detailed description of a typical embodiment of the invention shown in the accompanying drawing.

Referring to the drawing, the valve body 10 has an inlet 11 connected with the supply line 12 from which fluid flows past the valves to the outlet 13 connecting with the discharge line 14. A predetermined back pressure is maintained on the fluid in the supply line 12 by a relief valve 15 that normally is pressed downwardly against its seat 16 by coil spring 17. The relief valve has a depending guide portion 18 extending through the seat, and carries a guide rod 19 movable vertically within bore 20 of a plug 21 threaded into the upper end of the body. Plug 21 is adjustable, by removing cap 22, to vary the closing force exerted by spring 17 against the valve 15, and therefore to adjustably predetermine the valve opening pressure. It is to be understood that the illustrated form of relief valve and its adjustment are to be regarded as typical only, and that the invention may be applied to various particular forms of relief valves adapted to open at predetermined pressures.

The valve body 10 contains a chamber 23 at the inlet side of the relief valve, fluid flow from the supply line 12 into the chamber 23 occurring past a check valve 24 having a seat 25 threaded into the inlet end of the body against shoulder 26. The check valve is shown to have a guide portion 27 within the seat bore, and a bore 28 that receives the lower end of rod 19 as a guide for the check valve in open positions. The primary purpose of the check valve is to close chamber 23 from the supply line 12, so that when the relief valve 15 is being tested under the pressure of fluid introduced to the chamber, that fluid pressure will be independent of the pressure existing in the supply line.

Pressure fluid may be admitted to chamber 23 in any suitable manner, as by way of a nipple 29 carrying a normally closed valve 30. When the relief valve opening pressure is to be tested, a suitable fluid pressure source and pressure indicator may be attached to nipple 31 and the valve 30 then opened to admit fluid at determinable pressure to chamber 23. As a typical fluid pressure supply means I show an assembly, generally indicated at 32, comprising a pump 33, check valve 34 and fitting 35 carrying a pressure gage 36, connected with nipple 31 by a union 37. As will be understod, the apparatus 32 normally is disconnected from the relief valve body and may be used to test any number of relief valve assemblies of the type described.

Assuming that the relief valve opening pressure is to be determined at a time when the supply line pressure is insufficient to open the valve, the apparatus 32 is connected to the valve 30, the latter then opened and a suitable testing fluid forced by pump 33 into chamber 23. The pressure in chamber 23 seats the check valve 24 and increases to a maximum at the point at which the relief valve 15 unseats. Accordingly, this maximum or valve opening pressure is indicated directly by the gage 36. Should further adjustment of the relief valve be required to maintain a particular back pressure in the supply line, such adjustment may be made and the valve opening pressure again tested as described, until proper setting of the relief valve is obtained.

It is to be understood that the drawing is merely illustrative of the invention in one of its typical and preferred forms, and that various changes and modifications may be made without departure from the invention in its intended spirit and scope.

I claim:

1. In a valve device of the character described, the combination comprising a chamber having an inlet and an outlet, a relief valve, means exerting a closing force against the relief valve whereby the valve is adapted to open at prodetermined pressure in said chamber to discharge fluid from the chamber through said outlet, a second valve adapted to close said inlet, and normally inoperative means for testing the opening pressure of the relief valve, provided with means for selectively admitting fluid to said chamber under pressure independently of said inlet to close said second valve and open the relief valve, and means for indicating the pressure in said chamber when the relief valve opens due to said fluid under pressure.

2. In a valve device of the character described, the combination comprising a chamber having an inlet and an outlet, a relief valve, means exerting a closing force against the relief valve whereby the valve is adapted to open at predetermined pressure in said chamber to discharge fluid from the chamber through said outlet, a second valve adapted to close said inlet, normally inoperative means for testing the opening pressure of the relief valve, provided with manually operable means for selectively forcing fluid under pressure into said chamber independently of said inlet to close said second valve and open the relief valve, and means for indicating the pressure in said chamber when said relief valve opens due to said fluid under pressure.

3. In a valve device of the character described, the combination comprising a chamber having an inlet and an outlet, a relief valve, means exerting a closing force against the relief valve whereby the valve is adapted to open at predetermined pressure in said chamber to discharge fluid from the chamber through said outlet, a self closing check valve adapted to close said inlet, and normally inoperative means for testing the opening pressure of the relief valve, provided with means for controllably and selectively admitting fluid to said chamber under measured pressure, independently of said inlet to close said check valve and open the relief valve, and means for indicating the pressure in said chamber when said relief valve opens due to said fluid under pressure.

4. In a valve device of the character described, the combination comprising a chamber having an inlet and an outlet, a relief valve, means exerting a closing force against the relief valve whereby the valve is adapted to open at predetermined pressure in said chamber to discharge fluid from the chamber through said outlet, a self closing check valve adapted to close said inlet, normally inoperative means for testing the opening pressure of the relief valve, provided with manually operable means for selectively forcing fluid under controllably variable pressure into said chamber independently of said inlet to close said check valve and open the relief valve, and means for indicating the pressure in said chamber when said relief valve opens due to said fluid under pressure.

5. In a valve device of the character described, the combination comprising a chamber having an inlet and an outlet, a relief valve, means exerting a closing force against the relief valve whereby the valve is adapted to open at predetermined pressure in said chamber to discharge fluid from the chamber through said outlet, a second valve adapted to close said inlet, normally inoperative means for testing the opening pressure of the relief valve, said means comprising a pump for forcing fluid under pressure into the chamber, a conduit connecting said pump with the chamber, and pressure indicating means in said line between the pump and chamber for measuring the pressure in said chamber when said relief valve opens due to said fluid under pressure.

6. In a valve device of the character described, the combination comprising a chamber having an inlet and an outlet, a relief valve, means exerting a closing force against the relief valve whereby the valve is adapted to open at predetermined pressure in said chamber to discharge fluid from the chamber through said outlet, a self closing check valve adapted to close said inlet, normally inoperative means for testing the opening pressure of the relief valve, said means comprising a pump for forcing fluid under pressure into the chamber, a conduit connecting said pump with the chamber, and pressure indicating means in said line between the pump and chamber for measuring the pressure in said chamber when said relief valve opens due to said fluid under pressure.

JOHN F. WEBSTER.